United States Patent [19]
Benest

[11] Patent Number: 5,957,383
[45] Date of Patent: Sep. 28, 1999

[54] METHOD AND APPARATUS FOR CONTROLLING IMPLEMENT PORTIONS

[75] Inventor: Roger Sydney Benest, Jersey, United Kingdom

[73] Assignee: Benest Engineering Limited, Jersey, United Kingdom

[21] Appl. No.: 08/885,457

[22] Filed: Jun. 30, 1997

[51] Int. Cl.[6] ...................................................... B05B 1/20
[52] U.S. Cl. ........................ 239/166; 239/159; 239/165; 239/167; 239/168
[58] Field of Search ................................. 239/159, 165, 239/166, 167, 168

[56] References Cited

U.S. PATENT DOCUMENTS

| | | | |
|---|---|---|---|
| 3,581,993 | 6/1971 | Reams | 239/168 X |
| 4,044,952 | 8/1977 | Williams et al. | 239/168 X |
| 4,288,034 | 9/1981 | Widmer et al. | 239/168 |
| 4,595,140 | 6/1986 | Harden et al. | 239/167 |
| 5,507,435 | 4/1996 | Benest | 239/167 X |
| 5,794,852 | 8/1998 | Wald et al. | 239/167 |

*Primary Examiner*—Andres Kashnikow
*Assistant Examiner*—Robin O. Evans
*Attorney, Agent, or Firm*—McCormick, Paulding & Huber

[57] ABSTRACT

An apparatus for controlling the relative positioning of two hingedly connected implement portions movable between deployed or working and folded or stowed positions relative to one another includes a strut like component connected between the two implement portions and in the form of an hydraulic damper or shock absorber which is extensible and retractable in damped fashion. When the connecting component is fully extended or retracted, it serves as a strut for transmitting forces from one implement portion to the other to effect movement of said implement portions to or from their working and stowed positions. At other times, when not in a fully extended or retracted position, the connecting component serves as a damper dampingly resisting relative movements between the two implement portions to yielding absorb impacts and other dynamic loads imposed on one or the other of the boom portions.

6 Claims, 7 Drawing Sheets

METHOD AND APPARATUS FOR CONTROLLING IMPLEMENT PORTIONS

FIELD OF THE INVENTION

This invention relates to a method and apparatus for controlling implement portions. An example of the application of the invention is to the control of boom portions in an agricultural or horticultural sprayer. It is envisaged however, that other applications of the invention will relate to other agricultural and horticultural implements in which there is a requirement for controlling the movement of an implement portion between a working position and a stowed or other position.

BACKGROUND OF THE INVENTION

In the case of an agricultural boom-type sprayer there arises in certain types of sprayer a requirement to fold the boom portions inwardly and upwardly for transport purposes. Various mechanisms and linkages have been proposed for this purpose and a preferred arrangement is one in which a single actuator such as a ram can cause simultaneous relative pivotal movement of two or more boom portions so that they effect the required folding movement in a progressive manner. In such a relatively complex assembly, it will be appreciated that requirements arise for adjustment of the mechanism so that the boom portions revert to their required horizontal positions when required and that they do so in a reliable manner without becoming out of adjustment due to wear, and without a tendency to oscillate or vibrate during use.

Various complex proposals have been made in this regard including the use of planetary geared mechanisms interconnecting the boom portions, but such arrangements are vulnerable to overload and do not provide the necessary rugged durability which is somewhat of a prerequisite for day-to-day farm usage.

References disclosing general background and other technical subject matter related to the present invention are as follows US 42 13 565 (Jackson)
GB 15 92 859A (Haylock)
GB 20 26 828A (Clark Equipment)
GB 21 10 062A (Moteska)
GB 21 49 281A (Moteska)

These disclosures include (Clark Equipment, FIG. 2) the use of a hydraulic shock absorber 124 that serves as a damping means with respect to actuation of the boom of a mobile vehicle under the control of a mechanical linkage 80 that serves as a forcing means for selectively applying an actuating force to move the boom between its upper and lower positions. The hydraulic shock absorber 124 acts in parallel with a spring 58 in a manner comparable to that in an automotive suspension in the sense that the shock absorber serves to damp movement permitted by spring 58. The actual movement is caused by linkage 80.

Jackson, (FIG. 2) proposes to use a spring to provide "shock absorbing" characteristics. Haylock, (FIG. 3) proposes a somewhat similar spring-biased ram control linkage. Moteska, (FIG. 2) proposes a twin-compression-spring "damper" connected in series with a hydraulic ram to pivot a boom portion to and from its forwardly-folded transport position in a mobile spraying machine.

None of the above-cited references proposes the use of an oil-damped extensible and retractable hydraulic shock-absorbing strut member to apply to a movable implement portion the necessary forces to effect movement of such implement portion between its working and stowed or other positions during use. Indeed, none of the references uses an oil-damped extensible and retractable hydraulic shock-absorbing strut member in any way as a means for moving an implement portion in any way whatever. The only disclosure of use of a hydraulic shock absorber in the above references is in the Clark Equipment specification, and that utilises the linkage 80 to apply control forces to the boom. The shock-absorber 124 is used solely to damp boom movement thereby caused.

Accordingly, none of the above specifications teaches the use of a hydraulic shock absorbing strut member to control a pivotable boom portion in order to achieve the advantages disclosed herein including improved control, automatic strut length-adjustment, yielding under load and related dynamic advantages. Indeed, the concept of using as a thrust-transmitting strut member a mechanical construction which actually passively yields under compressive or extensive loads is apparently one which has hitherto been avoided presumably as a result of a prejudice against the lack of controllability which may hitherto have been perceived in such an arrangement.

References in the prior art to "damping means" such as item (8) in the Moteska specification refer (apart from the above-discussed disclosure in the Clark Equipment specification) to the use of spring systems, whether double or single acting. Although such use of the term damping means may be in accordance with common parlance, spring systems do not provide, in principle, operating characteristics which are strictly damped since (ignoring friction) spring systems merely sequentially store and then release energy received and do not offer the energy-absorbing damping function which a hydraulic damper offers by virtue of its orifice-and-piston-based damping function.

SUMMARY OF THE INVENTION

According to the invention there is provided a method and apparatus for controlling a spraying boom or other like agricultural or horticultural implement having an implement portion which is movable from a working position to a stowed or other position, as defined in the accompanying claims.

In an embodiment of the invention described below, a movable sprayer boom portion has applied thereto the necessary force to effect its pivotal movement between its working and stowed positions through an extensible and retractible shock absorbing strut member. In this manner the strut member is able to accommodate wear and other variables which are generated during use. Moreover, the strut member permits dampened movement from a previous position, so as to accommodate such variables during use.

In use, the strut member applies to the movable boom portion the necessary reaction forces to maintain the boom portion in its working position. In this way, the shock absorber effects a degree of control over the movement of the boom portion, maintaining it (by virtue of its damping action) in a defined end (or working) position, while permitting dampened movement away therefrom under overload when necessary, whereby the frequent adjustments called for by prior art mechanisms are no longer a requirement. Nevertheless, the shock absorber is able to act as a strut member in terms of applying to the boom portion the necessary forces for moving it to and from its working position.

Also in the embodiment, the arrangement is such that an important and last portion of the movement of the boom portion from its stowed or other position to its working position is effected with gravity (or it could be spring)—assistance whereby the shock absorbing strut member is compressed or retracted at least slightly from its previous fully extended position (adopted under tension from the ram) so as to permit accommodation of the movement under the action of gravity, (or it could be the action of a spring), and thereafter (due to the damping effect of the damper) tending to hold the boom portion in its working position. This arrangement provides an effective and convenient means for achieving the defined working end position of the boom in a reliable manner. Moreover, it obviates the need to adjust the linkage mechanism so that the linkage itself defines the end position which would lead to a frequent need for adjustment.

In the embodiment, the linkage interconnecting the boom portions is actuated by a ram to cause their simultaneous relative pivotal movement in opposite rotational directions about spaced pivot axes, including the pivot interconnecting the boom portions. In this way, a simple one-ram actuation of the boom assembly is able to achieve the required relative movement of the boom portions in a controlled manner with the simultaneous advantage of the dampened and controlled movements resulting from the use of the shock absorbing strut member.

In the embodiment, the shock absorber provides a variable length tie rod in the linkage which controls the boom portions, and the tie rod also serves as a damper to damp undesirable movement between the boom sections. For example, when the boom portions are being folded and are approaching their closed positions, the closing mechanism reaches its mechanical limit while there is still some 10 to 20 degrees of movement remaining before the boom is completely folded. The extra travel distance required from the tie-rod shock absorber is provided by the latter extending under gravity (or spring force) from its previous fully compressed condition caused by extension of the control ram, thus allowing the on going movement necessary for the boom to achieve its folded position. While the implement is in transit, the dampening action of the shock absorber provides stress relief for the boom and boom control structure under dynamic loads.

Generally, the arrangement is such that the weight of the boom (or spring force) is able to overcome the resistance to movement provided by the shock absorber's damping mechanism during the latter stages of movement into one boom position (eg the boom working position) and this accommodation of the necessary movement is complemented by the damping effect which serves to maintain the assembly in its desired working position at both limit locations. In situations where gravity control is inconvenient, a spring may be required to exert a comparable effect.

In the embodiments, the shock absorbing strut or link member provides automatic limit adjustment at either the open or closed positions, or both, of the implement. The shock absorber also damps the implement during operation with respect to forces originating from the tractor or the like traversing undulating ground.

In accordance with these latter aspects of the invention there is provided a method and apparatus for controlling a spraying boom, or other agricultural or horticultural implement wherein a shock absorber is arranged to retract or extend to accommodate movement under stored (gravity or spring or the like) energy of an implement or an implement portion as said implement or implement portion approaches an end position (such as a working position) and to likewise extend or retract to accommodate corresponding movement as the implement or implement portion approaches another end position (for example a stowed position) and to cushion the implement or implement portion at either or both of said end positions.

In the embodiment, the shock absorber or damping device is arranged to become fully compressed or fully retracted in order to transmit the principal boom control loads. The control linkage for the shock absorber is arranged to reach the limit of its travel before the required limit of travel of the boom portion or portions, and thus the latter continue their movement to their end position under the action of the stored energy due to the inclination of the hinges on which they are mounted.

The principles of the invention are applicable to many implements that can benefit from dampened movement control. The invention also offers a system wherein gravity or spring force assists placement of an implement or implement portion in its working position, and is then cushioned or dampened against undesirable vibratory or other motion induced during working, and is maintained in the working position without the need for frequent adjustments to accommodate wear.

In the embodiments, the shock absorbing strut or link member may, for example, be a modified automotive shock absorber, for example of the double-acting gas or oil-filled kind. Alternatively, a modified hydraulic ram having a damping orifice in the piston may be employed in order to provide a more robust structure for the purposes of transmitting the substantial loads which can arise.

In the embodiments of the invention the construction of the shock-absorbing strut or link member is similar to that of an automotive shock absorber, being constructed as an hydraulic orifice-damped device which has a completely passive function when in its at-rest condition. The strut or link serves to transmit, in compression or tension, forces required for moving the movable implement portion between its working and other positions. As a result, the strut or link is initially extended or retracted at a rate permitted by its internal damping system. It then reaches an end position in which it is "bottomed-out" and is effectively solid for force-transmission purposes. Typically, the strut or link provides cushioning for the last small proportion of the movement of a movable implement portion to its end position. In that end position (in contrast to prior spring-based systems) the strut or link is in a passive condition and has a length determined by the geometry of the system. The system is arranged so that the strut is not fully compressed or extended in the working and stowed positions of the boom so that the damper exerts its damping effect on the boom in those positions. The construction of the hydraulic damper may differ from that utilised strictly for automotive applications though such applications represent an economic source of generally suitable hardware for the purpose.

BRIEF DESCRIPTION OF THE DRAWINGS

Embodiments of the invention will now be described by way of example with reference to the accompanying drawings in which:

In FIG. 1, the boom portions are shown in their lowered working positions;

FIGS. 18, 19, and 20 correspond respectively to FIGS. 1, 2 and 3, and show a boom assembly identical to that of FIGS. 1, 2 and 3 except for including a spring for biasing the boom portions relative to one another toward both their working end positions and toward their non-working end positions.

DESCRIPTION OF THE PREFERRED EMBODIMENTS

Figure 1:
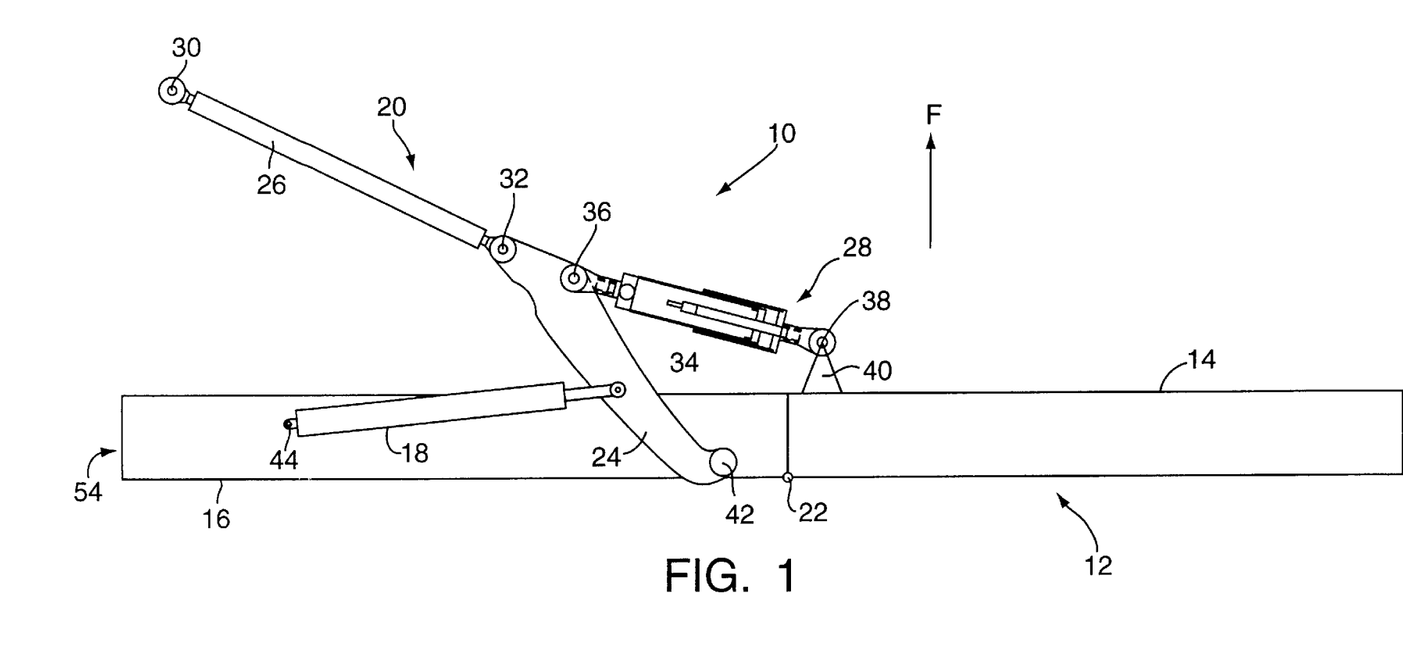
FIG. 1 shows a general view of a boom assembly of an agricultural sprayer together with an associated control mechanism including an operating ram and a linkage interconnecting two boom portions and an associated mounting such as a mounting hitch assembly on an agricultural tractor.

As shown in FIG. 1, apparatus 10 is for controlling a spraying boom 12 comprising an outer boom portion 14 and an inner-boom portion 16. The outer boom portion 14 is movable from its working position shown in FIG. 1 to a stowed or other position shown in FIGS. 2 and 3. As will be apparent from the following description, the inner boom portion 16 simultaneously moves from its working position shown in FIG. 1 to its stowed or other position, as also shown in FIGS. 2 and 3.

Apparatus 10 comprises an energisable or operatable actuator 18 in the form of a hydraulic ram which is connected to a linkage 20 acting between outer boom portion 14 and inner boom portion 16 which (to the extent that the boom portions pivot relative to each other) is relatively fixed with respect thereto.

Boom portions 14 and 16 are of triangular cross sectional shape and are pivotally interconnected at 22 by a hinge whereby they can execute pivotal movement about a hinge axis extending in the direction of one edge of the triangular section, this edge being on the rear side of the boom with respect to the travel direction F, and the hinge axis thus extending generally upwardly and forwardly with respect to the travel direction, at an angle of about 60 degrees to the horizontal. In this way, the outer boom portion 14 can swing rearwards and simultaneously upwards about this axis from its FIG. 1 working position to its FIG. 3 folded position.

Figure 2:
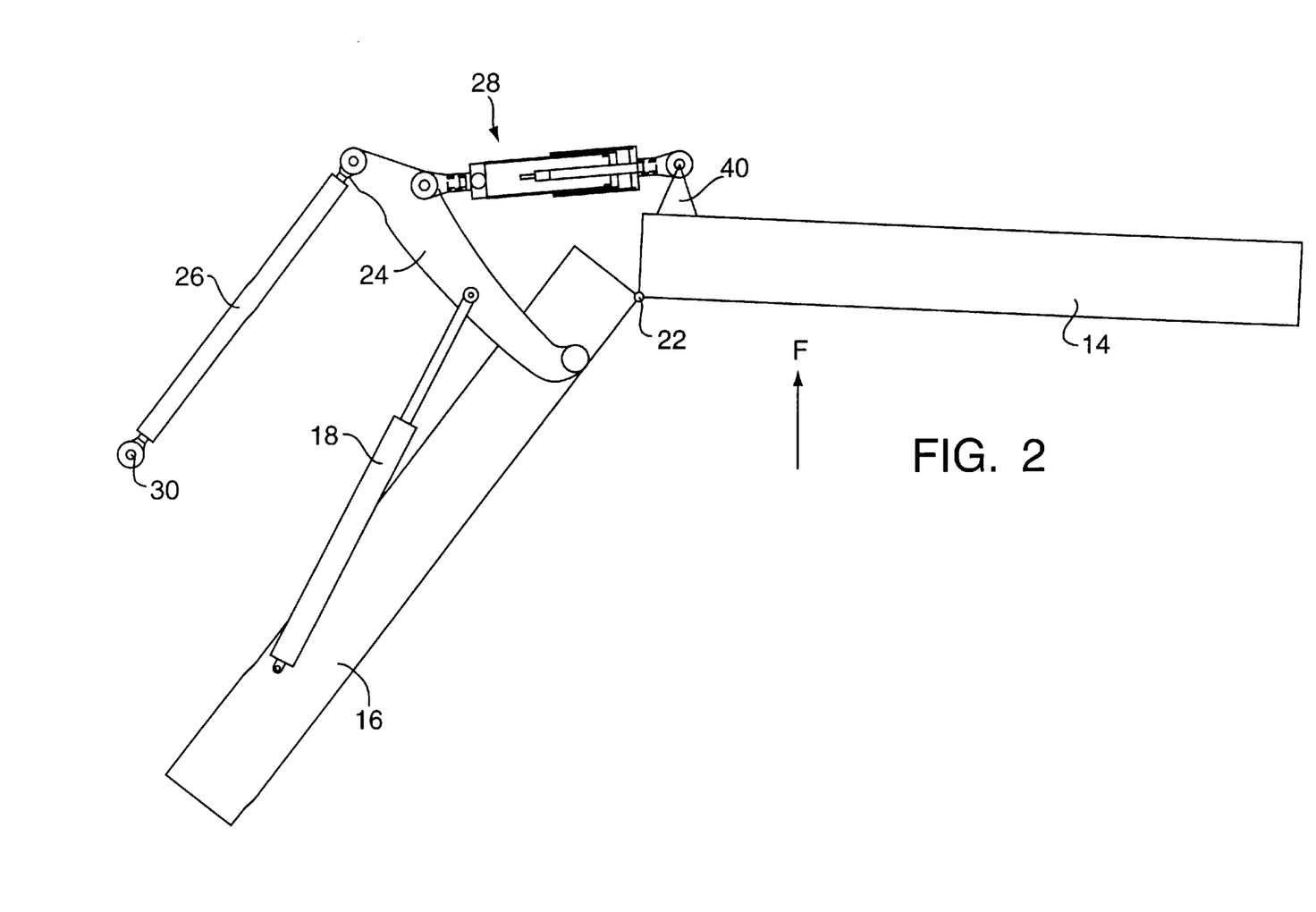
FIG. 2 shows the assembly of FIG. 1 in a partially folded condition.
Figure 3:
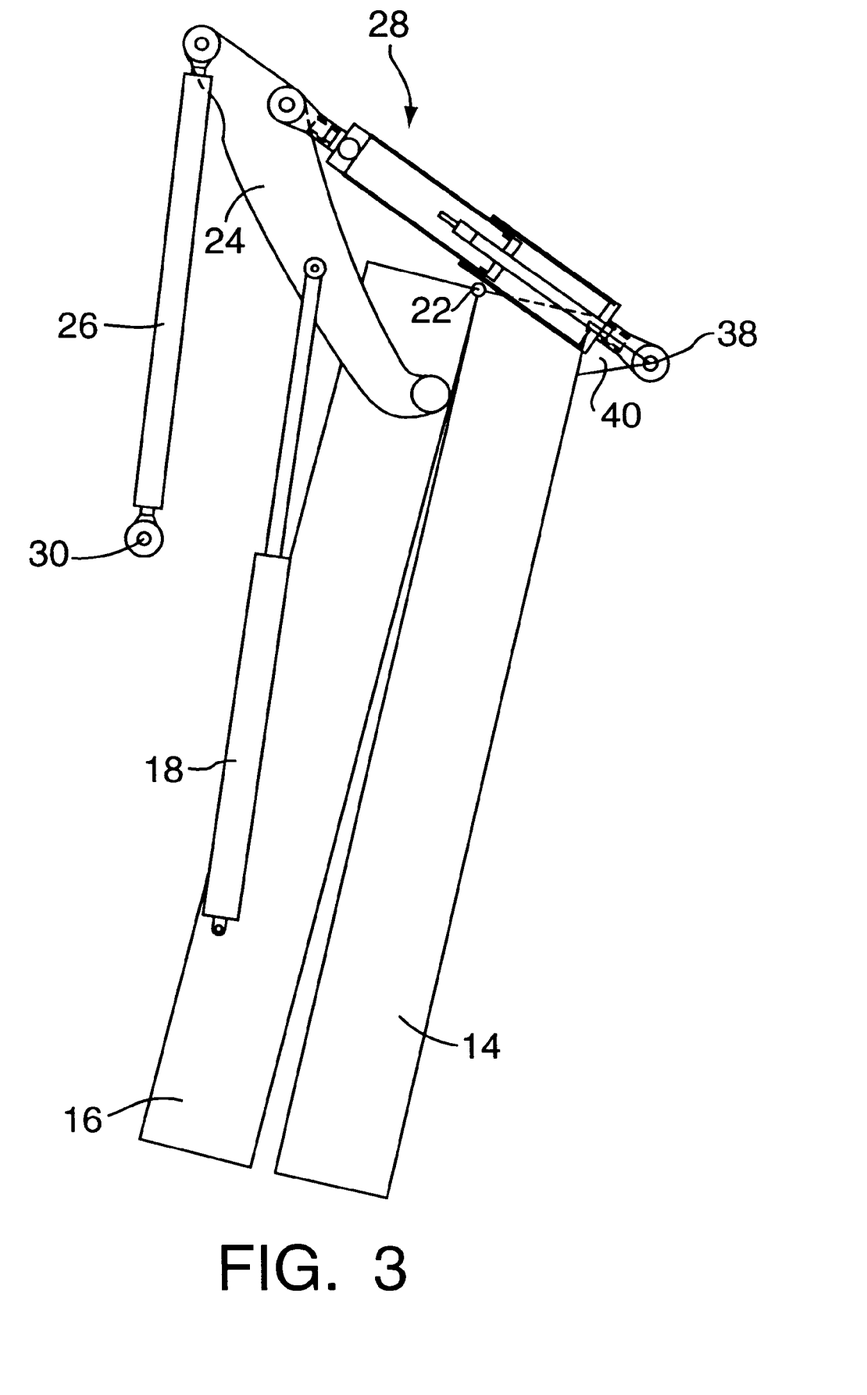
FIG. 3 shows the assembly of FIGS. 1 and 2 in a more fully folded position.

In FIGS. 1 to 3 of the drawings, the triangular construction of the boom portions has not been shown, for simplicity of illustration of this three-dimensional feature. It will be understood however that the attitude of hinge axis 22 is such that outer boom portion 14 is urged by gravity into its in-line extended relationship with inner boom portion 16 as shown in FIG. 1.

Linkage 20 is mounted on the forward side of boom portions 14 and 16 and comprises a pivot lever 24, a tie rod 26 and a shock-absorbing strut or link member 28. Tie rod 26 is connected at its inner end 30 to the mounting structure of the sprayer, such as a fully-mounted sprayer support structure carried by the hitch links of a tractor, or a wheel-mounted sprayer chassis (not shown). The outer end 32 of tie rod 26 is pivotally connected to pivot lever 24. Likewise, the outer end 34 of actuator 18 is also pivotally connected to pivot lever 24, as is the inner end 36 of shock absorbing link member 28.

The connections between linkage 20 and the boom portions 14 and 16 are as follows. Shock absorbing strut or link member 28 is pivotally connected at 38 to an upstanding lever arm 40 provided at the inner end of outer boom portion 14. Pivot lever 24 is pivotally connected at 42 to inner boom portion 16 at a location in the region of its outer end. Ram 18 is pivotally connected at 44 to inner boom portion 16 at a location on the inner part of that boom portion.

Ram 18 is extensible from its retracted position shown in FIG. 1 to its fully extended position shown in FIG. 3 through its intermediate position shown in FIG. 2. During such extension, the boom portions are moved in three dimensions relative to each other through the FIG. 2 position to the FIG. 3 position.

Figure 4:
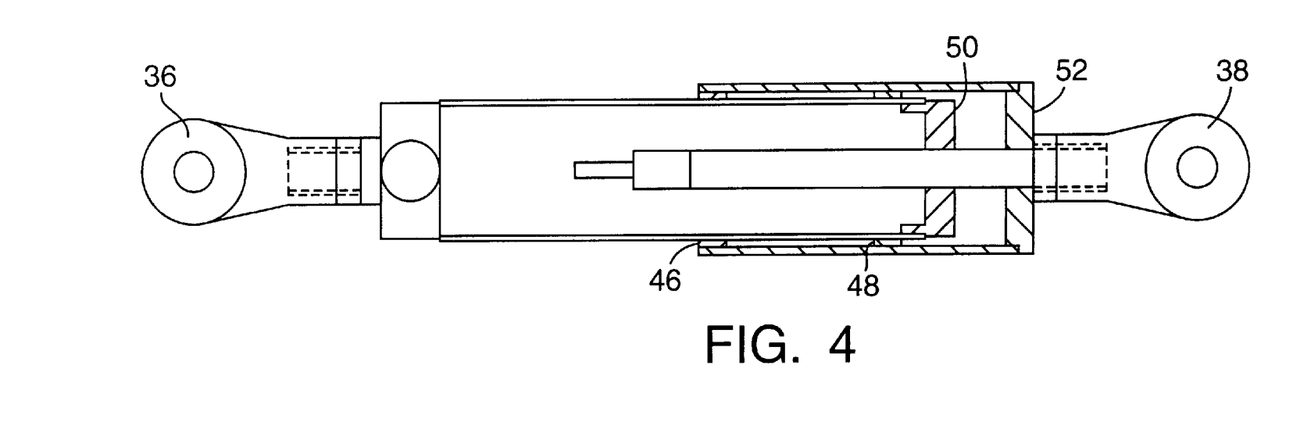
FIGS. 4 and 5 show, on a larger scale, a shock-absorbing strut or link member forming part of the control mechanism of FIGS. 1 to 3.
Figure 5:
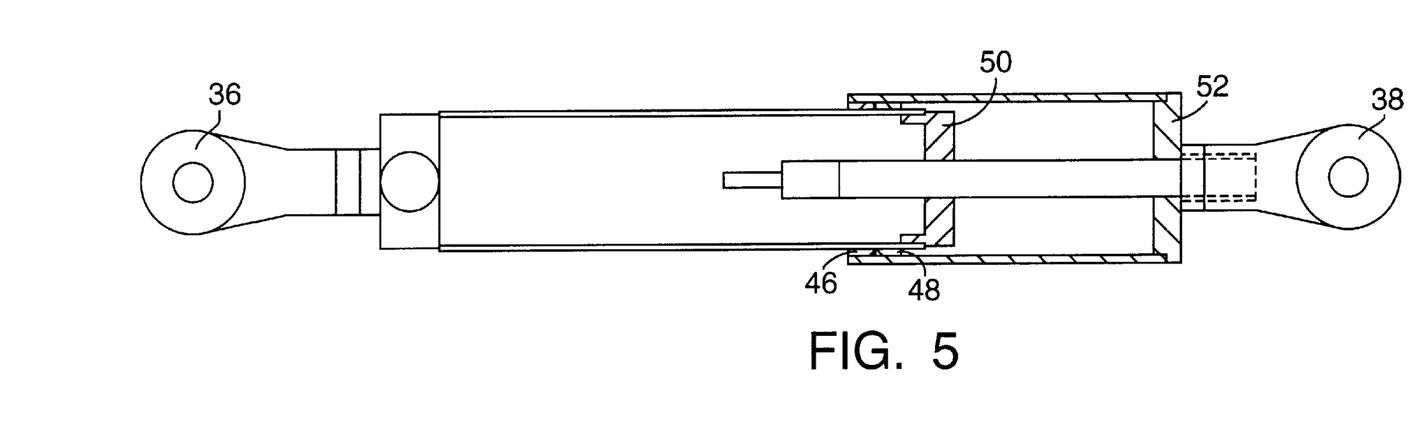

Shock absorbing link or strut member 28 has the structure generally shown in FIGS. 4 and 5 comprising limit rings 46 and 48 and limit stops 50 and 52 defining the limits of retraction and extension shown respectively in FIGS. 4 and 5. The remainder of the structure of the shock absorbing link or strut member is generally conventional. For example, an adapted automotive shock absorber may be employed, being of the conventional oil-damped construction (details not shown for simplicity of illustration), but not incorporating the resilient coil springs which conventionally form part of the damped suspension assembly in an automotive application.

In use, extension of ram 18 effects movement of the boom portions between the positions of FIGS. 1, 2 and 3. As ram 18 extends from its FIG. 1 position, the geometry of linkage 20 is such that the clockwise motion of lever 24 about pivot 42 causes counter-clockwise motion of tie rod 26 about pivot 30 whereby inner boom portion 16 likewise pivots counter-clockwise about a pivot axis located in the region of its inner end 54, and being aligned so as to be parallel with hinge axis 22. As boom portion 16 pivots upwards towards its FIG. 2 position, shock absorbing link member 28 serves as a strut or link initially in compression and controlling the attitude of outer boom portion 14 while it moves through the FIG. 2 position to the FIG. 3 position.

In this embodiment, the structure of the individual boom portions 14 and 16 is such that shock absorbing strut 28 is able to adopt the overlapping position shown in FIG. 3 without fouling the structure or compromising the integrity of the boom assembly. This is achieved by virtue of the 3-dimensional triangulated structure of the boom portions which has not been indicated by the simple rectangular representation of these in the drawings.

During controlled movement of the boom portions between their FIGS. 1 and 3 limit positions, the shock absorbing strut member 28 applies to boom portion 14 the necessary forces to effect its controlled movement between such positions, and then functions to maintain the boom portions in their end positions. This control is effected through the dampened extensible and retractible action of the strut member, whereby it permits the last portion of the downward movement of the boom portions into the FIG. 1 position under gravity action, but with a dampened movement. Likewise, in the last portion of the movement of the boom portions to their FIG. 3 position, there is the same dampened control. Other advantages have already been described above.

Amongst other modifications envisaged for application to the above-described embodiment and falling within the scope of the claims are considerable variation in the geometry and general structure of the control linkage for the boom portions, the application of the system to other implements (or implement portions) which move from a working position to another position, modification of the shock absorbing strut or link member, and the use of spring or other means to cause the final stage of the movement of the implement portion to its working or other position. Such a spring means may, for example, be a spring such as the tension spring 124 of FIGS. 18, 19 and 20 which biases the two boom portions 14 and 16 to both the end working positions of FIG. 18 and the end stowed or folded non-working positions of FIG. 20.

In the above-described embodiment, apparatus 10 for controlling boom portions 14 and 16 has been described by reference to a plan view of the boom assembly as seen in FIG. 1, and thus the linkage 20 acting between the boom portions is seen as being located in front of the boom portions, with respect to the travel direction F of the sprayer. On account of the three-dimensional movement of the boom portions about their inclined axis, the connections to the strut member 28 and to the lever 24 are through ball-type universal joints.

As mentioned in the description above, the boom portions 14 and 16 have a generally triangular cross-sectional shape as seen in a lengthwise end elevation view of the boom, and the pivot or hinge axis 22 between the inner 16 and outer 14 boom portions extends lengthwise of one side of the triangular boom cross-sectional shape. Thus, the axis 22 extends generally upwardly with respect to the horizontal at an angle of around 60 degrees to the horizontal. Accordingly, folding of the boom portions relative to each other (in the manner illustrated in FIGS. 2 and 3) causes three-dimensional relative movement of the boom portions about this axis. In the case where the inner boom portion 16 remains horizontal and the outer boom portion is pivoting rearwards under the effect (for example) of an impact with the outer boom portion (on the front side thereof, which is the side on which the linkage 20 is located), the outer boom portion 14 will not only swing rearwards, but also upwards. Therefore, there will be a gravity-energised tendency to return to the extended position shown in FIG. 1.

Shock absorbing strut member 28 permits such movement of outer boom portion 14 by extension from its relatively retracted condition shown in FIG. 1. In FIG. 1, the linkage 20, including strut member 28, is in a relaxed condition.

Movement of the outer boom portion to its final extended working position is thus arranged to be effected by means of gravitational forces. The strut member 28 is arranged to permit this to occur by virtue of the strut member's ability to accommodate and thus to cushion relative movement of the boom portions by virtue of its hydraulic damping characteristics.

In a further modification, the tie rod 26 is omitted so that pivotal movement of the inner boom portion relative to the remainder of the spraying implement is not caused by ram 18. In this modification, alternative systems are provided for effecting the inward folding movement of the inner boom portion (and thus of the outer boom portion which is carried on it). There is disclosed in the present applicant's PCT application WO92/00670 further details of a boom construction to which the present invention may be applied. Likewise, there is disclosed in the present applicant's PCT application WO93/02552 a system of suspension for a boom type sprayer which is directly applicable to the boom system of the present invention. Such a boom suspension system provides for boom height control relative to the ground and for advantageous boom position maintenance in the circumstances where the boom is subjected to dynamic operating conditions.

Figures 6, 7, 8:
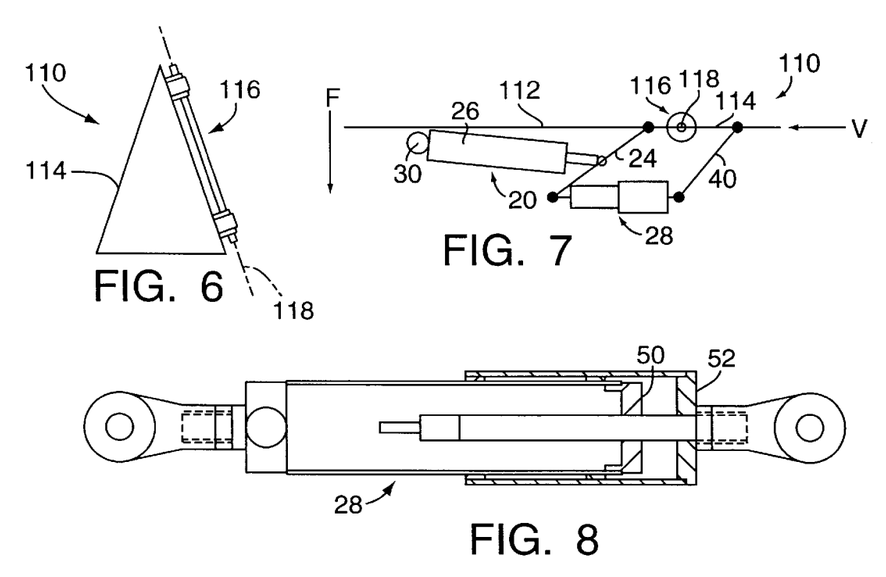
FIGS. 6 shows an end elevation view in a generally horizontal direction of a spraying boom and associated hinge means.
FIG. 7 shows a plan view of the boom of FIG. 6 with the hinge axis between two boom portions indicated.
FIG. 8 shows a damper or shock absorber of the assembly of FIG. 7, this being shown on a much larger scale and in its non-fully-extended or retracted condition as appropriate for the extended or working position of the boom seen in FIG. 6.

As shown in FIGS. 6, 7 and 8 an agricultural sprayer 110 comprises boom portions 112, 114 inter-connected by a hinge assembly 116 defining a hinge axis 118, which extends upwardly and slightly forwardly-of-vertical with respect to the direction F of normal forward motion of sprayer 110.

Figure 12:
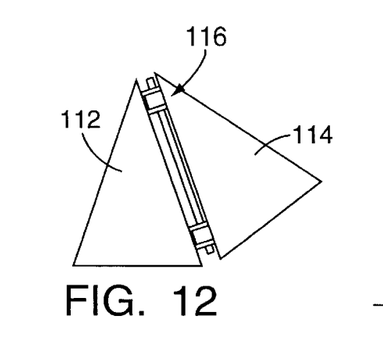
FIGS. 12, 13 and 14 likewise correspond to FIGS. 6, 7 and 8 showing the boom in its fully folded configuration.

In FIG. 7 (and likewise in FIGS. 10, 13 and 16) the boom portions 112 and 114 have only been represented diagrammatically by single lines, and the hinge axis 118 is likewise shown diagrammatically without attempting to indicate its inclination. The inclination however, can clearly been seen in FIG. 6 and the end elevation view of FIG. 6 is indicated by arrow V in FIG. 7. The same applies of course to the views of FIGS. 9 and 12 and 15. These views correspond to that of FIG. 6.

In FIG. 7, the boom portions, are interconnected by a linkage extending across hinge assembly 116 and including also a ram for actuation purposes. For simplicity of description and numeration, the parts of this linkage corresponding to those of the embodiment of FIGS. 1, 2 and 3 have been given the same numbers as that embodiment. The exact physical construction shown in FIGS. 7 and 10 and 13 and 16 does not correspond with that of the embodiment of FIGS. 1, 2 and 3 but the differences are not significant for the purposes of explanation of the principles of the invention, for which it is believed the following will be sufficient for the purposes of the person having ordinary technical competence in the art.

In this embodiment, the connections of the control linkage for the boom portions to those boom portions are, as in the previous embodiment, through ball joints to accommodate the three-dimensional movement arising from the inclination of the hinge axis 118. The connection of the ram 26 at 30 to a structure capable of resisting the reaction forces generated will be well understood by the technically competent person. In the case where the linkage 20 is provided in order to control movement only of the outer boom portion 114 with respect to the inner boom portion 112 and without the need for the linkage itself to cause folding movement of the inner boom portion with respect to its mounting on an agricultural tractor, then the connection at 30 is provided simply to the inner boom portion itself and the linkage 20 is thus located solely in the region of the boom hinge assembly to control movement about that hinge axis. Alternatively, as described above in relation to FIGS. 1 to 3, the ram 26 may be connected to the main tractor-carried sprayer boom support structure which is conventional apparatus and therefore not shown.

FIGS. 6, 7 and 8 show sprayer 110 in its boom-open working position in which the boom portions 112 and 114 are in end-to-end extended configuration for spraying operations. In this configuration, shock absorber/damper 28 is in the condition shown in FIG. 8 in which it is neither fully retracted nor fully extended and thus its end limit stops 50, 52 are spaced apart and therefore (for example) the shock absorber/damper can be extended to the condition shown in FIG. 17 to enable the boom to yield to an obstacle.

As in FIGS. 4 and 5, damper/shock absorber 28 is shown in simplified format in which the conventional hydraulic damping components have been omitted for simplicity of illustration. The assembly is to be understood to include these conventional hydraulic structures of the kind which are provided, for example, in an automotive shock absorber. In the extended boom position of FIGS. 6, 7 and 8 the boom portions 112 and 114 are held gravitionally in their end-to-end relationship by virtue of the inclination of hinge axis 118. Movement away from this position has the effect of storing energy for the return movement. Therefore, this gravitational effect itself serves to hold the boom portions in their working relationship. In addition to this the damping effect of shock absorber/damper 28 supplements this effect by virtue of its own damping effect, which is chosen to be sufficient for maintenance of the boom portions in their required working attitude under loads normally encountered during use. In the case of the dropleg-type sprayers of the kind identified above originating from the Applicant, such working loads are slightly higher than in the case of conventional non-dropleg sprayers which normally make no direct contact with the ground.

Figure 9:
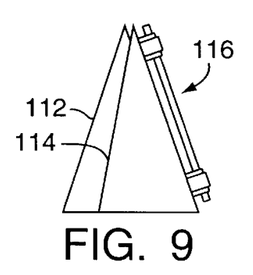
FIGS. 9, 10 and 11 show three further views of the embodiment of FIGS. 6, 7 and 8 these views corresponding respectively to FIGS. 6, 7 and 8 but showing the boom in a position in which it is commencing its powered movement from the FIG. 7 working position to the FIG. 13 folded or non-working position of the boom, and the damper or shock absorber is shown in FIG. 11 in it fully retracted or compressed condition.
Figure 10:
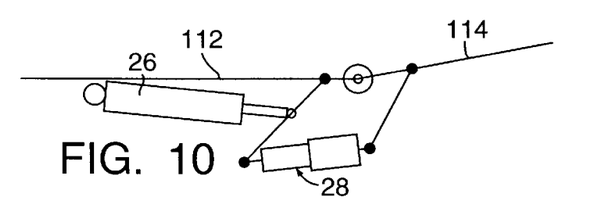
Figure 11:
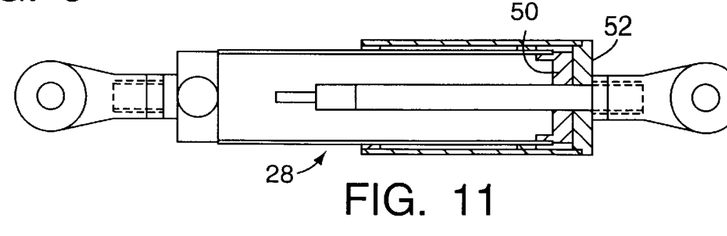
Figure 13:
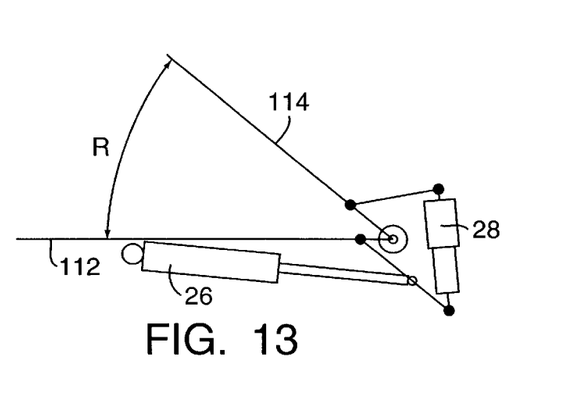

As shown in FIGS. 9, 10 and 11 movement of boom portions 112, 114 from their FIG. 7 working position towards their FIG. 13 folded or transport position commences with extension of ram 26 and retraction of shock absorber/damper 28 to the configuration shown in FIG. 11 in which its stops 50/52 are in contact.

Figure 14:
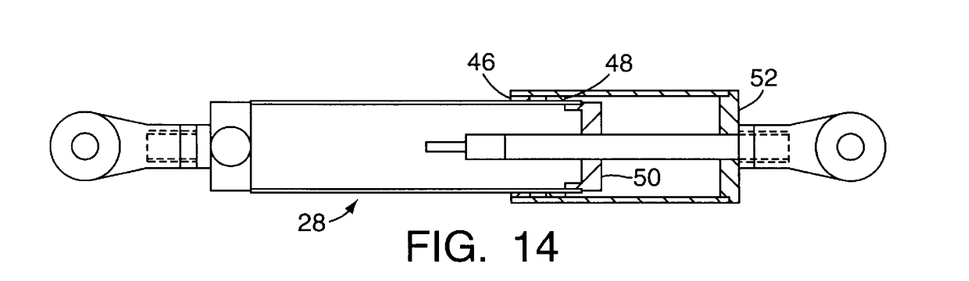

Then, further extension of ram 26 acts through shock absorber/damper 28 as a solid strut, moving it towards the FIG. 14 position.

However, before reaching the FIG. 13 position, ram 26 reaches the end of its stroke at the position actually shown in FIG. 13. At this point, there remain about 15 to 20 degrees of angular closure movement remaining and this then occurs without any further extension of ram 26. This short range of angular movement is indicated in FIG. 13 by reference letter R, which thus gives some measure of the extent of movement permitted by the shock absorber/damper under its own capacity for extension. The geometry of the system is arranged to be such that, at the fully folded position after executing the arc of movement R, and with the boom portions substantially closed, there remains a short remaining portion of the stroke of the shock absorber (before stop rings 46, 48 make contact) in which the shock absorber/damper can exert its damping effect on the folded outer boom portion so that under the dynamic effect of high speed transport on a tractor, it can damp the otherwise potentially damaging movement of the folded boom structure. FIG. 3 shows the boom portions fully folded.

Figure 15:
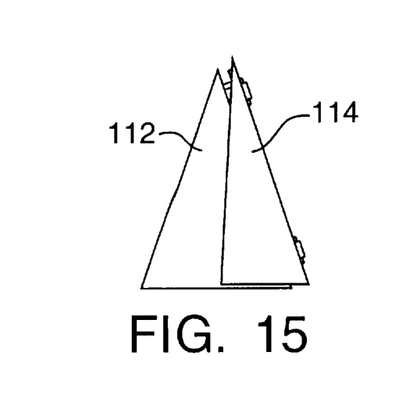
FIGS. 15, 16 and 17 show the boom in its condition after it has encountered an obstacle and the outer boom portion has yielded by damped movement of the shock absorber.
Figure 16:
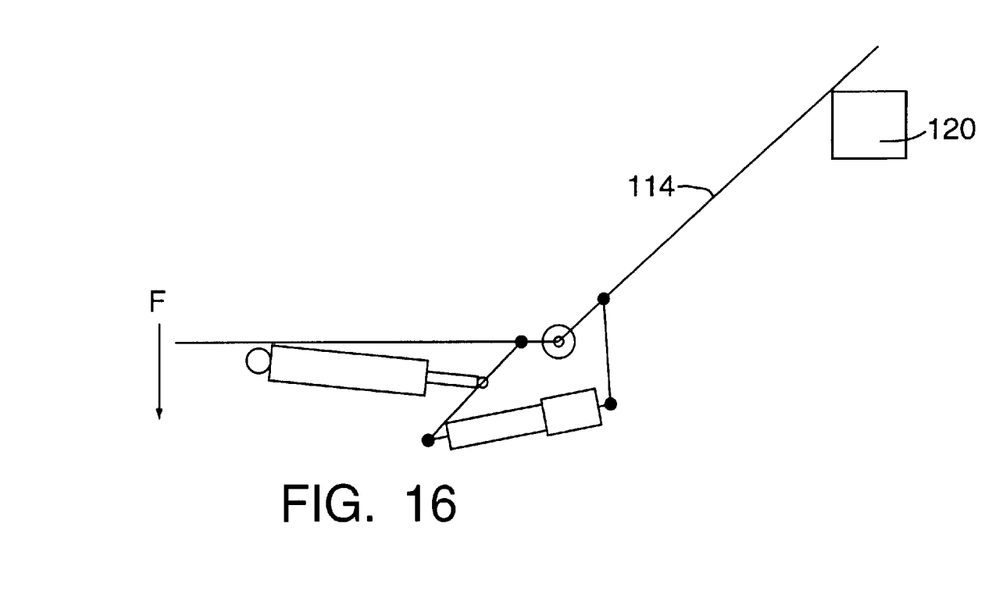
Figure 17:
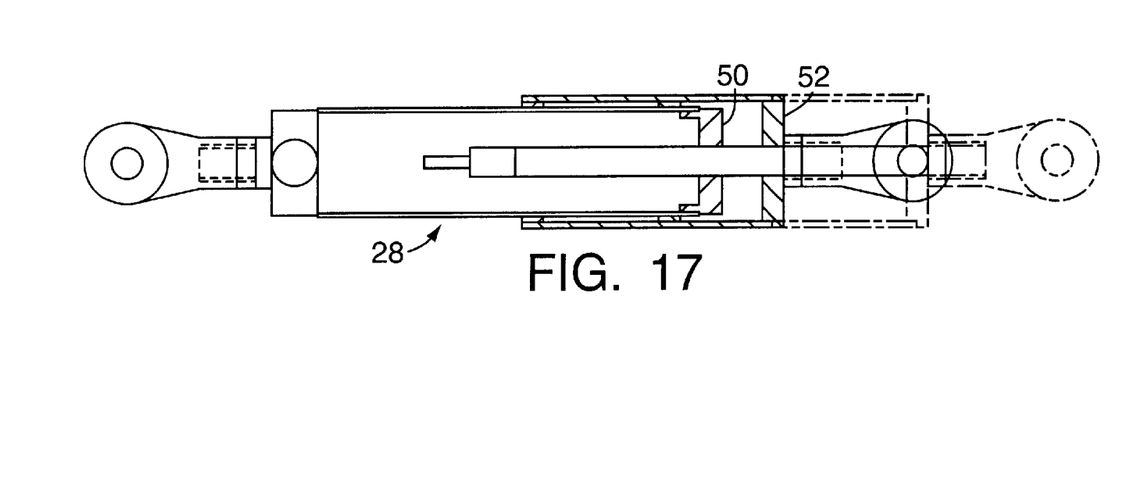

Turning now to FIGS. 15, 16 and 17, these drawings show the boom portions providing a breakaway function. In other words, starting from the FIG. 7 position, an obstacle 120 has been encountered by outer boom portion 114 which has yielded by pivotal movement about hinge axis 118 from the FIGS. 6, 7, 8 position. This yielding movement protects the boom portion from the worst effects of the mechanical damage which would otherwise occur and the shock absorber/damper extends from its FIG. 8 configuration (shown in FIG. 17 by its end stops 50, 52) to the extended configuration indicated by the breakaway movement 122.

Accordingly, it can now be clearly seen that the embodiments provide a simple and cost effective means for controlling the movement of boom portions and similar apparatus. There is avoided the complications and the need for regular adjustment which are inherent in prior art defined-length linkages for controlling. angular movement. The system of the present invention allows the required end positions of the boom or other portions to be defined by those boom portions themselves under the action of gravity or a stored energy system. The dual purpose shock absorber/damper serves in the working and storage or other positions of the boom portions to hold these where they are required and with the required damping effect. In the working position of the boom portions, the damping effect enables obstacles to be encountered with reduced damage to the boom portions. In the transport position of the boom portions, the damping effect minimises damage due to dynamic loads arising in high speed transit. Due to the inherent adjustability of the length of the damper/shock absorber, it automatically accommodates itself to the required end positions both as original equipment and after wear due to prolonged use.

In addition to the above functions, the dual purpose shock absorber/damper also functions as a mechanical strut for moving the boom portions to and from their required working and transport positions. It achieves this simply by allowing itself to be fully retracted or fully extended during an initial short portion of the stroke of the controlling mechanism, for example a simple ram.

I claim:

1. A method for controlling a boom of a sprayer or a like agricultural or horticultural implement and which boom has at least one boom portion which is moveable from a working position to a stowed or other non-working position, the method comprising the steps of:

providing said boom portion mounted so as to be moveable between said working position and said non-working position;

connecting to said boom portion an hydraulic damper which is extensible and retractable in damped fashion between fully extended and fully retracted conditions;

causing said connected damper to provide the function of serving, when fully extended or retracted, as a strut for transmitting forces to or from said boom portion for effecting movement of said boom portion to or from said working position and said non-working position;

further causing said damper to provide the function of serving, when not fully extended or retracted, as a damper for said boom portion in said working position or in said non-working position of said boom portion;

connecting said damper to actuating means arranged to put said damper into compression or tension to move said boom portion between said working and non-working positions, so that in moving said boom portion from one of said working and non-working positions to the other of those positions said actuating means first compresses or extends said damper in a damped manner to said fully retracted or fully extended condition and then to transmits an actuating force to said boom portion through said fully extended or retracted damper acting as a solid strut;

causing said actuating means when moving said boom portion toward said working or non-working position to reach the end of its travel before said boom portion fully reaches its working or non-working position; and after said actuating means reaches the end of its travel when moving said boom portion toward said working or non-working position causing stored energy means to take said boom portion onwards towards said working or non-working position with accompanying damp extension or retraction of said damper.

2. The method of claim 1 wherein said stored energy means comprises inclined hinge means whereby said boom portion swings upwards as it moves away from its working or non-working position.

3. The method of claim 1 wherein said stored energy means comprises spring means whereby said boom portion swings against the action of said spring means as it moves away from its working or non-working position.

4. Apparatus for controlling a boom of a sprayer or like agricultural or horticultural implement and which boom has at least one boom portion which is moveable from a working position to a stowed or other non-working position, the apparatus comprising:

a mount;

a boom portion mounted to said mount so as to be moveable relative to said mount between said working position and said non-working position;

said boom portion being connected to a hydraulic damper which is extensible and retractable in damped fashion between fully extended and full retracted conditions;

said damper being so connected to said boom portion and to said mount as to serve, when fully extended or fully retracted, as a strut for transmitting forces to or from said boom portion for effecting movement of the boom portion to or from said working position or said non-working position;

the connection of said damper to said boom portion and to said mount further being such that said damper provides the function, when not fully extended or retracted, of a damper for said boom portion in said working or in said non-working position of said boom portion;

said damper being connected to actuating means arranged to put said damper into compression or tension to move said boom portion between said working and non-working positions;

said actuating means further being arranged so as, when moving said boom portion from one of said working and non-working positions to the other of those positions to initially compress or extend said damper in a damped manner to said fully retracted or fully extended condition and to then transmit an actuating force to said boom portion through said damper acting as a solid strut;

said actuating means also being arranged so that when moving said boom portion toward said working or non-working position said actuating means reaches the end of its travel before said boom portion reaches said working or non-working position; and stored energy means adapted to take the boom portion onwards to said working or non-working position with accompanying damped extension or retraction of said damper after said actuating means reaches the end of its travel when moving said boom portion toward said working or non-working position.

5. The apparatus of claim 4 wherein said stored energy means comprises inclined hinge means whereby said boom portion swings upwards as it moves away from its working or non working position.

6. The apparatus of claim 4 wherein said stored energy means comprises spring means whereby said boom portion swings against the action of said spring means as the boom portion moves away from its working or non-working position.

* * * * *